United States Patent
Mandai et al.

(10) Patent No.: US 6,463,742 B2
(45) Date of Patent: Oct. 15, 2002

(54) GAS TURBINE STEAM-COOLED COMBUSTOR WITH ALTERNATELY COUNTER-FLOWING STEAM PASSAGES

(75) Inventors: Shigemi Mandai; Kiyoshi Suenaga; Katsunori Tanaka, all of Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/825,881

(22) Filed: Apr. 5, 2001

(65) Prior Publication Data

US 2001/0027653 A1 Oct. 11, 2001

(30) Foreign Application Priority Data

Apr. 7, 2000 (JP) ........................ 2000-106883

(51) Int. Cl.[7] ................................................ F02C 7/12
(52) U.S. Cl. .................................................. 60/806
(58) Field of Search ............................................ 60/806

(56) References Cited

U.S. PATENT DOCUMENTS

| 4,474,014 A | 10/1984 | Markowski |
| 5,950,417 A | 9/1999 | Robertson, Jr. et al. |
| 6,018,950 A | 2/2000 | Moeller |
| 6,155,040 A | * 12/2000 | Sasaki ........................ 416/95 |
| 6,354,073 B1 | * 3/2002 | Hiramoto et al. ........ 60/39.182 |

FOREIGN PATENT DOCUMENTS

| DE | 4137638 | 6/1993 |
| EP | 0199534 | 10/1986 |
| EP | 0624757 | 11/1994 |
| JP | 3-267618 | 11/1991 |

* cited by examiner

Primary Examiner—Ehud Gartenberg
(74) Attorney, Agent, or Firm—Wenderoth, Lind & Ponack, L.L.P.

(57) ABSTRACT

A steam-cooled combustor for a gas turbine has cooling steam passages, the steam flowing in opposite axial directions in adjacent channels.

2 Claims, 8 Drawing Sheets

GAS TURBINE STEAM-COOLED COMBUSTOR WITH ALTERNATELY COUNTER-FLOWING STEAM PASSAGES

BACKGROUND OF THE INVENTION

1. Field of the Invention

The present invention relates to a gas turbine and, specifically, the present invention relates to a cooling system for a gas turbine combustor.

2. Description of the Related Art

In general, there are two types of cooling systems for the wall of a gas turbine combustor. One is a compound air cooling system employing both convective cooling and film air cooling using air as cooling fluid and another is steam cooling system using steam as cooling fluid. In an actual gas turbine, one of the compound air cooling system and the steam cooling system is selected according to the temperature of combustion gas at the inlet of turbine.

Figure 1:
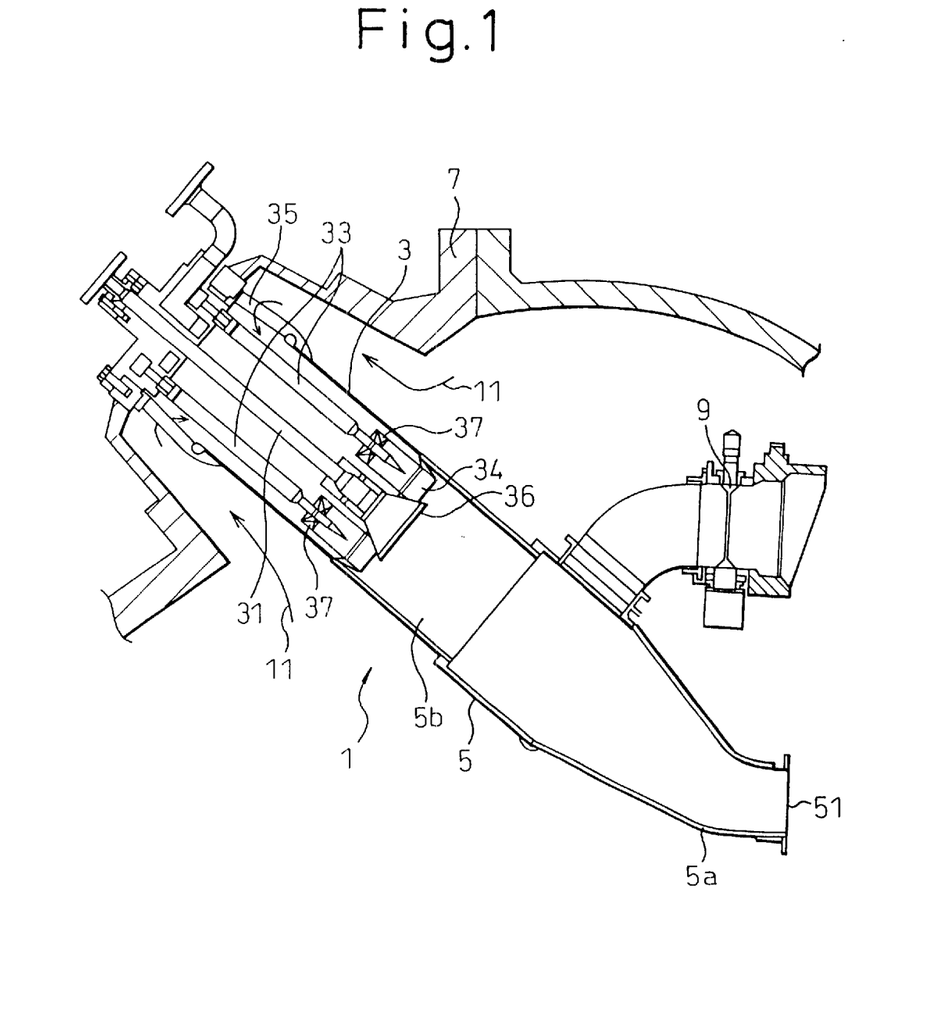
FIG. 1 is a longitudinal section view showing a general construction of a gas turbine combustor employing a compound air cooling system.

FIG. 1 is a sectional view showing a general construction of a gas turbine combustor employing a compound air cooling system.

In FIG. 1, reference numeral 1 designates a combustor of a gas turbine as a whole. The combustor 1 consists of a combustion tube 5b which acts as a combustion chamber for burning fuel injected from fuel nozzles 33 and a tail pipe 5a which directs combustion gas generated in the combustion tube to the first stage stator of the turbine. The combustor tube 5b and the tail pipe 5a are made as separate parts and joined together to form a combustor 1.

Fuel is injected into the combustion tube 5b from the main nozzles 33 as a premixed air-fuel mixture. The air-fuel mixture is ignited by a pilot flame formed by a pilot nozzle 31 and generates a premixed flame in the combustion tube.

Figure 8:
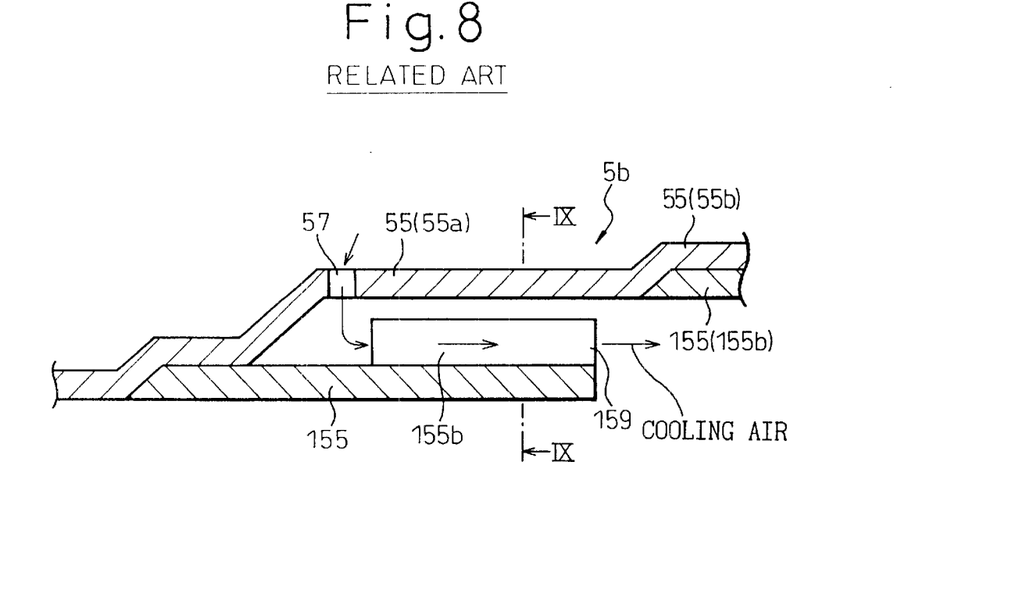
FIG. 8 is an enlarged section view of the wall of a gas turbine combustor employing a conventional compound air cooling system.

FIG. 8 is a enlarged section of the wall of the combustor tube 5b employing a conventional compound air cooling system. As can be seen from FIG. 8, in an actual gas turbine, the combustor tube 5b is formed by joining a plurality of cylindrical shells 55 having different diameters. The respective shells 55 are aligned in the axial direction and are joined to each other through stepped diameter portions thereof. Each of the shells 55 acts as a structural member forming the combustor tube 5b. A heat insulating member 155 is disposed at inside of each cylindrical shell 55 in order to protect the shell from the flame in the combustor tube and, thereby, preventing a strength degradation of the shell as a structural member.

In the conventional cooling system, fin-rings are used for the heat insulating members 155. The fin-ring consists of a cylindrical member having numerous grooves on the outer surface thereof extending in the axial direction. Each of the fin-rings 155 is held inside of the shell by attaching one end thereof to the smaller diameter portion of the corresponding shell 55 (i.e., a fuel nozzle side end of the shell 55), for example, by brazing.

In this system, pressurized air in the casing 7 (FIG. 1) is introduced from inlet openings 57 distributed around the smaller diameter portion of the shell 55 into the space between the shell 55 and the fin-ring 155. Air introduced into the space passes through the axial grooves outside of the fin-ring 155 and cools fin-ring 155 by convective cooling. After passing through the axial grooves, air is injected from the outlet 159 at the end of the fin-ring 155 in the direction along the inner surface of the heat insulating member (in FIG. 8, indicated by reference numeral 155b) adjacent thereto. Thus, the wall surface of the combustion chamber, i.e., the inner surface of the adjacent fin-ring 155b is cooled by the film of the injected air.

Figure 10:
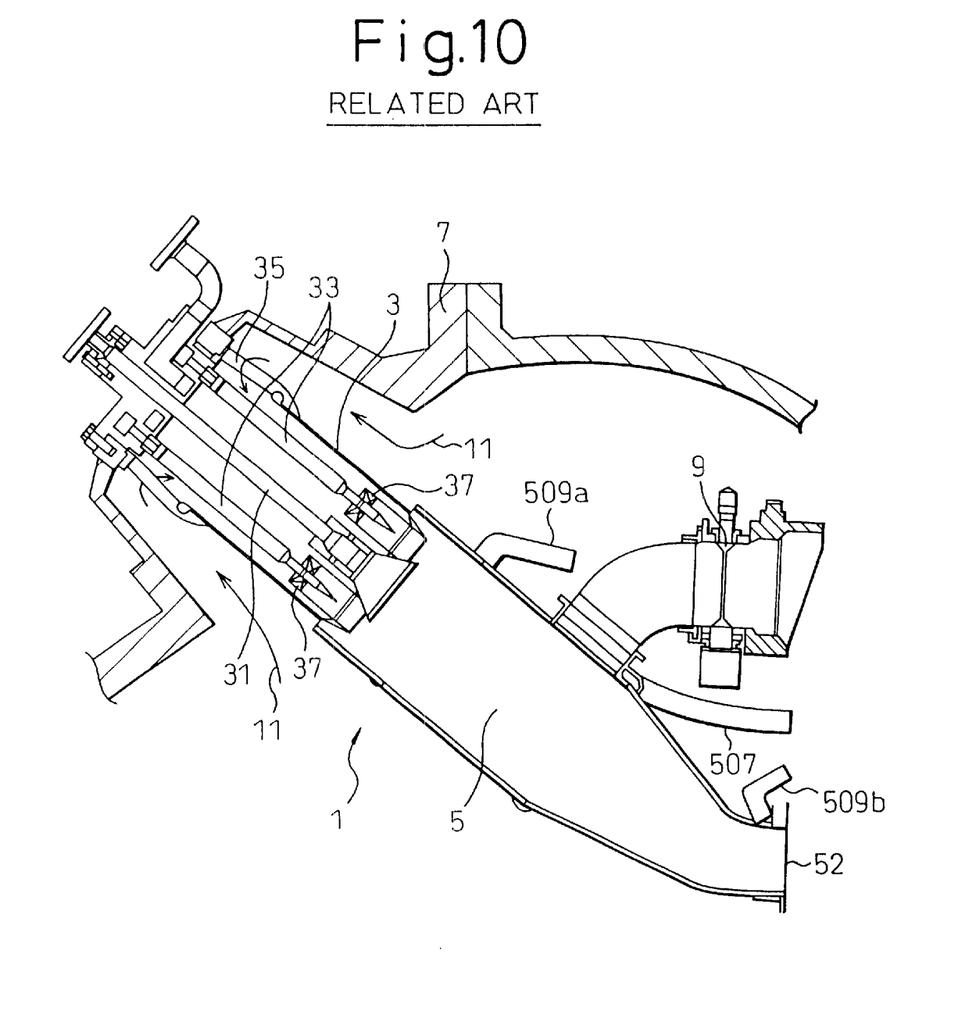
FIG. 10 is a longitudinal section view of a gas turbine combustor employing a conventional steam cooling system.

On the other hand, FIG. 10 is a sectional view similar to FIG. 1 showing a gas turbine combustor employing a conventional steam convective cooling system.

Since the heat-transfer coefficient of air is relatively low, sufficient cooling can not be obtained by convective cooling and, usually, a compound air cooling system using both convective cooling and film air cooling is employed in the air cooling system. However, compound air cooling system has its inherent problem. In the compound air system, air used for film air cooling is injected into the combustion tube and mixes with combustion gas. This cause dilution of combustion gas and lowers its turbine inlet temperature and, thereby, causes deterioration in the gas turbine output and efficiency.

In order to prevent this problem, the combustor in FIG. 10 employs steam cooling system using steam convective cooling instead of compound air cooling. Since the heat-transfer coefficient of steam is larger than that of air, the combustor is sufficiently cooled solely by convective cooling in the steam cooling system.

In FIG. 10, reference numerals the same as those in FIG. 1 denotes elements similar to those in FIG. 1.

The combustor in FIG. 10 is a one-piece construction in which the combustion tube 5b and the tail pipe 5a are formed as an integral part. Therefore, the combustion tube 5 in the combustor 1 in FIG. 10 has outlet 52 at one end thereof in order to supply combustion gas to the first stage stator of the turbine.

The combustion tube 5 in FIG. 10 has a double-wall construction including an outer shell (outer wall) and an inner shell (inner wall). The space between the outer shell and inner shell acts as a passage for cooling steam. Cooling steam is supplied to the cooling steam passage between the outer and the inner shells from a steam inlet connection 507 disposed near the center of the length of the combustion tube 5. The steam introduced into the cooling passage is divided into two streams flowing in the directions opposite to each other. Namely, a portion of the cooling steam flows through an upstream cooling passage in the wall of the combustion tube 5 from the inlet 507 in the upstream direction (i.e., towards the main nozzle 33 side) and other portion of the cooling steam flows through a downstream cooling passage in the wall of the combustion tube 5 from the inlet 507 in the downstream direction (i.e., towards the outlet 52 of the combustion tube). Cooling steam outlet pipes 509a and 509b are connected to the cooling steam passage at the upstream (main nozzle 33 side) end and the downstream (outlet 52 side) end of the combustion tube 5, respectively, in order to collect cooling steam after it cooled the combustor walls. Since the heat-transfer coefficient of steam is-relatively large, the walls of the combustor are sufficiently cooled by convective cooling using cooling steam.

The conventional compound air cooling system and the steam cooling system as explained above include respective drawbacks.

In the first place, in the compound air cooling system using the fin-rings, consumption of cooling air is large.

Figure 9:
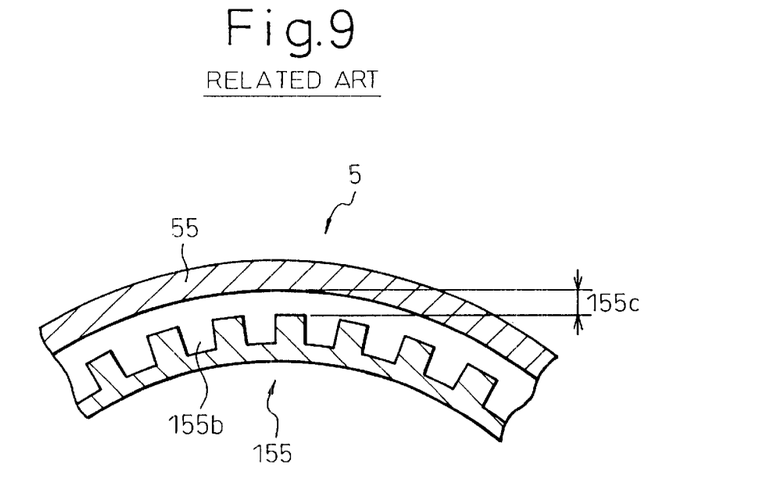
FIG. 9 is a cross sectional view taken along the line IX—IX in FIG. 8.

FIG. 9 is a cross sectional view taken along the line IX—IX in FIG. 8. As explained before, the fin-ring 155 is provided with grooves extending along the axial direction on the outer surface thereof. When the fin-ring 155 is attached to the shell 55, an annular clearance 155c must be disposed between the shell 55 and fin-ring 155 in order to avoid contact between the shell 55 and fin-ring due to thermal expansion of the fin-ring. When the manufacturing tolerance and the tolerance in the assembling of the combustor are taken into account, the required width of the clearance 155c becomes almost the same as the depth of the grooves 155b in some cases. Therefore, in the conventional compound air cooling system, since a relatively large clearance 155c between the outer surface of the fin-ring 155b and the inner surface of the shell 55, a large amount of cooling air passes through the clearance 155c in the axial direction and flows into the combustion chamber without passing through the grooves 155b. In other words, a large portion of the cooling air introduced from the inlet 57 flows into the combustion chamber without being used for cooling the fin-ring 155. Consequently, in order to obtain sufficient convective cooling of the fin-ring 155, the amount of cooling air supplied from the inlet 57 must be increased so that a sufficient amount of air passes through the grooves 155b.

Further, a large amount of cooling air which passes through the annular clearance 155c and does not contribute to convective cooling of the fin-ring 155 also flows into the combustion chamber and dilutes the combustion gas. Therefore, the drop of the combustion gas temperature due to introduction of cooling air becomes large in the conventional compound air cooling system.

The width of the annular clearance 155c may be reduced if the tolerances of machining and assembly of the shell 55 and fin-ring 155 are smaller. However, smaller tolerance in machining and assembly of these parts causes an increase in the cost and time required for manufacturing the combustion tube 5.

Further, in the conventional compound air cooling system using the fin-ring 155, since the fin-ring 155 is attached to the shell 55 at only one end thereof, it is difficult to increase the structural strength of the combustion tube assembly 5.

On the other hand, the problems such as those in the conventional compound air cooling system as explained above does not occur in the steam cooling system in FIG. 10. However the steam cooling system also has an inherent problem of a large consumption of cooling steam.

When the steam cooling system is used, as explained in FIG. 10, cooling steam is introduced into the cooling passage of the combustion tube 5 from the steam inlet 507 disposed near the center of the length of the combustion tube 5 and passes through the upstream cooling passage and the downstream cooling passage in directions opposite to each other. Usually, cooling steam is supplied to both an upstream and a downstream cooling passage at a same supply conditions.

However, although cooling steam is supplied at the same supply conditions, the heat loads on the upstream cooling passage and the downstream cooling passage are not the same and, usually, the heat load on the downstream cooling passage is larger than that on the upstream cooling passage.

Air-fuel mixture is injected into the combustion tube 5 from the main nozzles 33 at the upstream end thereof and it burns while it flows towards the outlet 52 of the combustion tube 5. Therefore, since the combustion of air-fuel mixture is not completed in the upstream half of the combustion tube 5, the temperature of the combustion gas is relatively low in the upstream half of the combustion tube 5. On the other hand, since combustion of air-fuel mixture is completed at the downstream half of the combustion tube 5, the temperature of combustion gas is higher at the downstream half of the combustion tube 5 than at the upstream half thereof. Consequently, heat load on the downstream cooling passage becomes higher than that on the upstream cooling passage.

However, since the supply conditions of the cooling steam to both cooling passage are the same, the supply conditions of cooling steam must be adjusted to meet the requirement of the downstream cooling passage where the heat load becomes the maximum in the conventional steam cooling system. This means that the wall of the upper half of the combustion tube 5 is cooled more than necessary (i.e., excessive cooling occurs at the upper half of the combustion tube 5). Therefore, in the conventional steam cooling system, an excess amount of cooling steam is required to cool the upper half of the combustion tube 5 excessively.

SUMMARY OF THE INVENTION

In view of the problems in the related art as set forth above, the object of the present invention is to provide a cooling system for a gas turbine combustor which is capable of reducing consumption of cooling air and/or cooling steam without lowering the cooling capacity.

The objects as set forth above are achieved by a cooling system for a gas turbine combustor, according to the present invention, comprising a combustion tube having a cylindrical shell which forms a combustion chamber therein for burning fuel, a cylindrical heat insulating member disposed in the shell and forming a wall of the combustion chamber, the heat insulating member being provided with a plurality of cooling air passages extending therein in the axial direction of the combustion tube for introducing cooling air into the cooling air passages from cooling air inlets of the respective cooling air passage disposed at one end of the heat insulating member and discharging cooling air, after cooling air passes through the cooling air passages, from cooling air outlets disposed at the other end of the heat insulating member in the axial direction along the inner surface of the heat insulating member, wherein, the heat insulating member is attached to the shell by joining one end thereof to the inner surface of the shell and provided with a sealing means on the outer surface of the heat insulating member at the portion between the cooling air inlets and the cooling air outlets for preventing cooling air from flowing into the combustion chamber through a clearance between the outer surface of the heat insulating member and the inner surface of the shell.

According to the present invention, since the cooling air passage is formed within the heat insulating member. Therefore, different from grooves in the related art, the cross section of the cooling air passage has no open side (i.e., the respective cooling air passages are surrounded by walls on all sides thereof). Further, since the seal ring disposed between the shell and the heat insulating member blocks cooling air passing through the annular space between the heat insulating member and the shell. Therefore, all of cooling air supplied to the heat insulating member passes through the cooling air passage and contributes to convective cooling of the heat insulating member. Thus, according to the present invention, the amount of cooling air requited for cooling the heat insulating member can be substantially reduced compared with that required when the fin-ring is used as the heat insulating member.

According to another aspect of the present invention, there is provided a cooling system for a combustor of a gas turbine which generates combustion gas by burning fuel for driving a turbine comprising a cylindrical combustion tube having an inlet end and an outlet end and forming a combustion chamber therein for burning fuel supplied from the inlet end thereof and supplying combustion gas to a turbine from the outlet end thereof, a plurality of cooling steam passages formed in the wall of the combustion tube and extending along the length of the combustion tube between the inlet end and the outlet end, the cooling steam passages including first cooling steam passages in which cooling steam flows in a first direction and second cooling steam passages in which cooling steam flows in a second direction opposite to the first direction.

According this aspect of the invention, two groups of cooling steam passages, i.e., the first cooling steam passages and the second cooling steam passages are provided in the wall of the combustion tube. In the first and the second cooling steam passages, cooling steam flows in the direction opposite to each other. Therefore, the average of the temperatures of cooling steam flowing through both first and second cooling steam passages become uniform along the length of the combustion tube and excessive cooling of the inlet side end of the combustion tube does not occur. Thus, the combustion tube is suitably cooled with smaller amount of cooling steam and the amount of cooling steam required for cooling the combustion tube can be reduced.

According to another aspect of the present invention, there is provided a cooling system for a combustor of a gas turbine which generates combustion gas by burning fuel for driving a turbine comprising a cylindrical combustion tube having an inlet end and an outlet end and forming a combustion chamber therein for burning fuel supplied from the inlet end thereof and supplying combustion gas to a turbine from the outlet end thereof, a cooling air passage disposed on the outer surface of the combustion tube for guiding cooling air along the outer surface of the combustion tube from a cooling air inlet thereof disposed at the portion near the center of length of the combustion tube to the cooling air outlet thereof disposed at the portion near the inlet end of the combustion tube and supplying cooling air from the cooling air outlet to the combustion chamber from the inlet end of the combustor so that cooling air after passing through the cooling air passage is used for burning fuel in the combustion chamber, and a cooling steam passage formed in the wall of the combustion tube and extending from a first portion near the center of the length of the combustion tube and a second portion near the outlet end of the combustion tube, the cooling steam passages introduce cooling steam thereinto from a cooling steam inlet disposed at one of the first and second portion and guiding cooling steam within the wall of the combustion tube in the direction along the length thereof to a cooling steam outlet disposed at the other of the first and second portion.

According to this aspect of the present invention, a downstream half of the combustion tube, where the combustion gas temperature is relatively high, is cooled by a cooling steam having a heat-transfer coefficient higher than cooling air, and a upstream half of the combustion tube, where the combustion gas temperature is relatively low is cooled by cooling air. Therefore, consumption of cooling steam is reduced compared with the case where both downstream half and upstream half of combustion tube are cooled by cooling steam. Further, cooling air after cooling the upstream half of the combustion tube is used as combustion air in this aspect. of the invention. Therefore, cooling air after cooling the combustion tube is used for burning fuel and does not dilute combustion gas. Thus, the temperature drop of combustion gas due to dilution, as well as a shortage of combustion air, does not occur.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the cooling system of the gas turbine combustor according to the present invention will be explained with reference to FIGS. 1 through 10.

(1) First Embodiment

FIG. 1 is a longitudinal section view showing a general construction of a gas turbine combustor according to the first embodiment of the present invention. A compound air cooling system is used for the combustor in this embodiment.

In FIG. 1, reference numeral 1 designates a combustor of a gas turbine as a whole. The combustor 1 consists of a combustor portion 5 and a nozzle portion 3. The nozzle portion 3 contains fuel nozzles for injecting fuel into the combustor portion 5.

In this embodiment, the combustor portion 5 includes a combustion tube 5b which acts as a combustion chamber for burning fuel injected from fuel nozzles and a tail pipe 5a which directs the combustion gas generated in the combustion tube 5b to the turbine inlet. The combustor portion 5 in this embodiment is formed by assembling the combustion tube 5b and the tail pipe 5a. The combustor 1 is held in a turbine casing 7 by supports not shown in the drawing. In an actual gas turbine, plural combustors as shown in FIG. 1 are arranged around the turbine at a regular interval and each supplies combustion gas to the turbine.

Combustion air (the arrow 11 in FIG. 1) is compressed from the atmosphere by a gas turbine compressor driven by the turbine and supplied to the casing 7. Combustion air 11 enters to the nozzle portion 3 of the combustor 1 through combustion air inlets 35 disposed around the nozzle portion 3 and is injected into the combustion portion 5 of the combustor 1 through a pilot nozzle 31 and main nozzles 33.

The nozzle portion 3 includes a cylindrical shell, a pilot nozzle 31 disposed at the center of the shell and plural main nozzles 33 (in this embodiment, eight main nozzles are used) disposed at a regular interval around the pilot nozzle 33. The pilot nozzle 31 is provided with a pilot fuel nozzle 31a for injecting fuel into combustion tube 5b. Fuel injected from the pilot fuel nozzle 31a is ignited by an igniter (not shown in the drawing) and, while it mixes with combustion air flowing through the pilot nozzle 31, burns in a diffusion combustion mode and forms a pilot flame.

In this case, the main nozzles 33 are formed as premix nozzles which form a premixed air-fuel mixture by mixing fuel injected from the fuel nozzles 33 into combustion air in the nozzle portion 3 before injecting premixed air-fuel mixture into combustion tube 5b. The main nozzles 33 are provided with swirlers 37. The swirlers 37 are formed as vanes having aerofoil shape cross sections and each is disposed at a predetermined angle to the combustion air flow in the nozzle 33 in order to impart tangential velocity to the combustion air flowing through the nozzle 33. Therefore, a swirl of combustion air is formed in the main nozzle 33 by the swirlers 37.

In this embodiment, a gaseous fuel such as town gas and natural gas and liquid fuel such as heavy oil or gas oil are used for fuel. Fuel is injected into the swirl of the combustion air in the nozzle 33 from injection holes (not shown in the drawing) disposed on the fuel nozzle 33 downstream of the swirlers 37. Therefore, the mixing of the injected fuel and combustion air is promoted by the swirl of combustion air and a uniform pre-mixture of air and fuel is formed in the main nozzle 33.

A funnel shaped pilot cone 36 is provided at the outlet of the pilot nozzle 31. The pilot cone 36 prevents the air-fuel mixture injected from the main nozzles 33 from contacting the pilot flame at the portion close to the outlet of the main nozzles 33 in order to avoid back firing in the main nozzles 33. A nozzle extension 34 is provided at the outlet of each main nozzle in order to guide the air-fuel mixture along the side surface of the pilot cone 36.

In FIG. 1 numeral 9 designates an air bypass valve. The air bypass valve 9 is a gate valve directly connecting the tail pipe 5b to the interior of the casing 7. The air bypass valve 9 controls the amount of combustion air supplied to the combustion portion 5 from the nozzle portion 3 in accordance with a load of the gas turbine. For example, when the amount of combustion air required for the combustion in the combustion portion 5 (such as during the start up and light load operation of the gas turbine), the air bypass valve 9 is opened by an actuator (not shown) in order to supply combustion air in the casing 7 directly to the interior of the tail pipe 5a. Since this causes a decrease in the combustion air flowing through the main nozzle 33, a suitable pre-mixture of air and fuel is formed in the main nozzle 33.

The air-fuel mixture injected from the main nozzles 33 around the pilot cone 36 contacts the pilot flame formed by the pilot nozzle 31 at the periphery of the outlet of pilot cone 36 and is ignited by the pilot flame. Therefore, the air-fuel mixture injected from the main nozzles 33 forms a premixed combustion flame at a portion sufficiently distant from the outlet of the main nozzle 33.

The combustion gas generated by the premixed combustion flame flows through the tail pipe 5a and inlet stator blades (not shown) and flows into the rotor blades of the turbine in order to rotate the same.

The construction of the combustor as explained above is basically the same as the construction of the combustor employing a conventional compound air cooling system.

Figure 2:
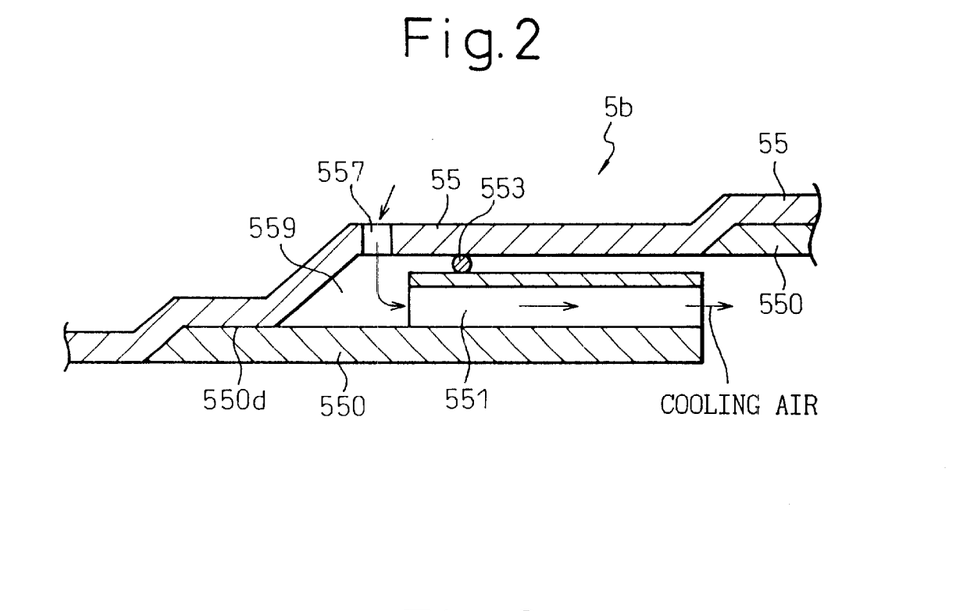
FIG. 2 is an enlarged sectional view of the wall of a combustion tube according to a first embodiment of the present invention.

FIG. 2 is a drawing similar to FIG. 8 which explains the cooling system of the combustion tube 5b of the present embodiment.

A compound air cooling system for combustion tube 5b using both convective cooling and film air cooling are also employed in this embodiment. Further, combustion tube 5b is formed by joining plural cylindrical shells 55 having different diameters in the axial direction. The cylindrical shells 55 are joined to each other through stepped diameter portions and act as structural members forming a combustion tube 5a. A cylindrical heat insulating member 550 is disposed in each cylindrical shell and acts as a wall of a combustion chamber.

Figure 3:
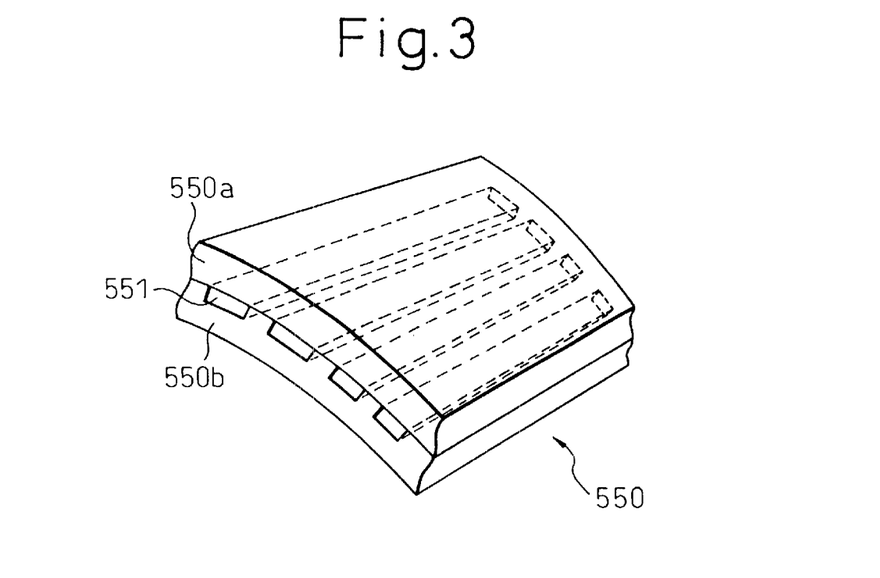
FIG. 3 is an enlarged perspective view of the cooling air passages in FIG. 2.

FIG. 3 shows a construction of the heat insulating member 550 in this embodiment. The heat insulating member 550 is a cylindrical member having a relatively large wall thickness and numerous cooling air passage 551, each having a rectangular shaped cross section, are extending in the axial direction within the wall thereof. The heat insulating member 550 in this embodiment is formed, for example, by joining two cylindrical members (an outer cylindrical member 550a and an inner cylindrical member 550b) using such as brazing. Numerous grooves having rectangular shaped cross sections and extending in the axial direction are formed on the outer periphery of the inner cylindrical member 550b. The outer cylindrical member 550a is provided with a flat inner surface. The heat insulating member 550 is formed by joining the outer surface of the inner cylindrical member 550b and the inner surface of the outer cylindrical member 550a by, for example, brazing after inserting the inner cylindrical member 550b into the bore of the outer cylindrical member 550a.

Thus, the axial grooves on the outer periphery of the inner cylindrical member 550b are covered by the inner surface of the outer cylindrical member 550a and the numerous cooling air passages 551 having rectangular shaped cross sections and independent from each other are formed in the wall of the heat insulating member 550.

As can be seen from FIG. 2, the heat insulating member 550 is joined to the inner surface of the shell 55 at the end of smaller diameter portion 550d of the shell. Further, a seal ring 553 made of a heat resistant material is interposed between the outer surface of the heat insulating member 550 and inner surface of the shell 55. The seal ring 553 seals the space between the outer surface of the heat insulating member 550 and the inner surface of the shell 55 and prevents the cooling air from flowing through this space.

In this embodiment, a portion of the pressurized air in the casing 7 flows into a cooling air chamber 559 in the shell 55 disposed at the end of the heat insulating member 550 through cooling air inlet openings 557 disposed around the smaller end portion of the shell 55. Cooling air further flows into the respective cooling air passages 55a from the cooling air chamber 559. After passing through the respective cooling air passages 550a and cooling the heat insulating member 550 by convective cooling, cooling air is injected from the cooling air passages 550a along the inner surface of the adjacent heat insulating member 550. Thus, a film of air for cooling the inner surface of the adjacent heat insulating member 550 (i.e., the inner surface of the combustion chamber) is formed.

Since the seal ring 553 for preventing cooling air from passing through the space between the heat insulating member 550 and the shell 55, all of cooling air introduced from the cooling air inlet 557 flows through the cooling air passage 550a in this embodiment. Therefore, the amount of air required for convective cooling of the gas turbine combustor can be substantially reduced without lowering the cooling capacity.

Further, since the seal ring 553 is disposed around the outer surface of the heat insulating member 550, the flow of the cooling air through the clearance between the outer surface of the heat insulating member 550 and the inner surface of the shell 55 is blocked even though the clearance is large in this embodiment. Therefore, the tolerance for machining and assembly of the heat insulating member 550 and shell 55 is not necessarily small except for the portion at which the heat insulating member 550 is joined to the shell 55. Thus, cost and time required for manufacturing the combustor can be reduced.

Figure 4:
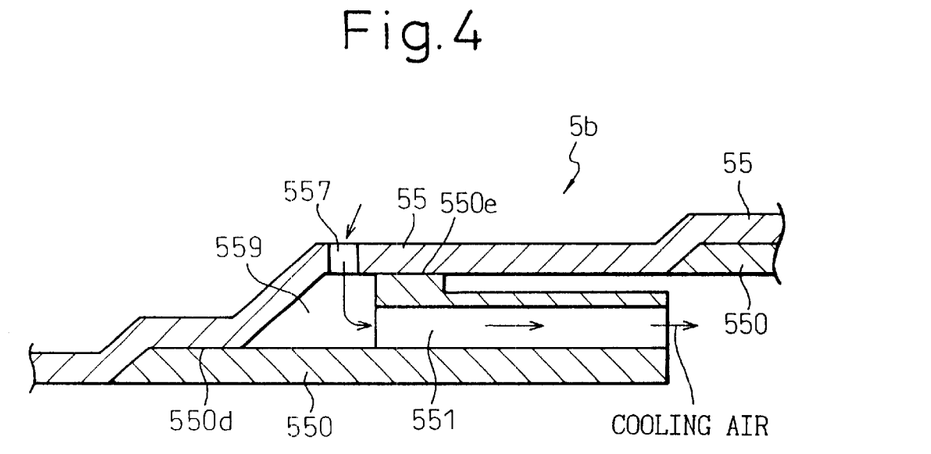
FIG. 4 is a view similar to FIG. 2 showing the wall of a combustion tube according to a modification of the first embodiment.

Although the space between the heat insulating member 550 and the shell 55 is sealed by the seal ring 553 in this embodiment, the space can be sealed by attaching the outer circumference of the heat insulating member 550 to the inner surface of the shell 50 at the portion between the inlet and the outlet of the cooling air passage 550a (550e in FIG. 4) by, for example, brazing as shown in FIG. 4. In this case, since the heat insulating member 550 is attached to the shell 55 at the seal portion 550e, as well as at the end portion 550d, the strength of the combustion tube assembly further increases.

(2) Second Embodiment

Figure 5:
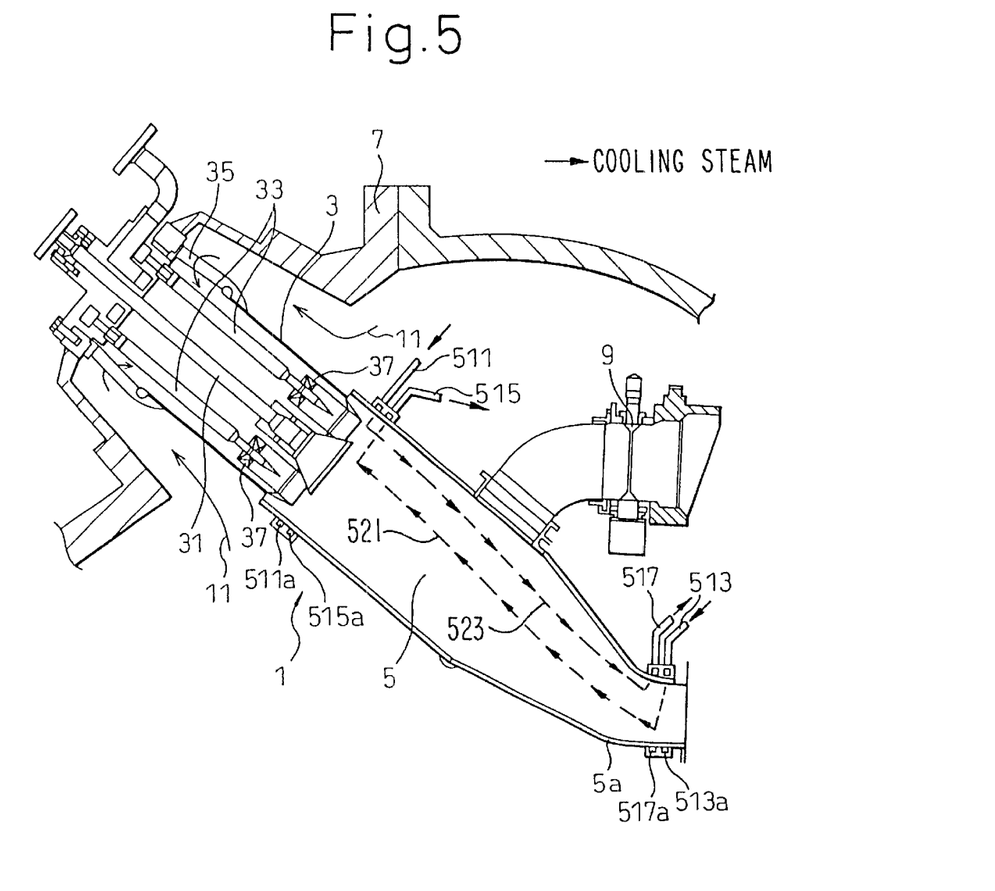
FIG. 5 is a longitudinal section view showing a general construction of a gas turbine combustor according to a second embodiment of the present invention.

FIG. 5 is a longitudinal section view similar to FIG. 1 which shows a gas turbine combustor according to the second embodiment of the present invention. In this embodiment, cooling of the combustor is performed using cooling steam.

In FIG. 5, reference numerals the same as those in FIG. 1 designate elements similar to those in FIG. 1.

In this embodiment, the construction of the combustor is different from that of FIG. 1 in that the combustor portion 5 of the combustor 1 is a one-piece construction in which the combustion tube 5b and the tail pipe 5b are formed as an integral part. Therefore, the combustor portion 5 will be referred to as a combustion tube 5 in this embodiment.

In this embodiment, similarly to the combustor in FIG. 10, the wall of the combustion tube 5 is cooled by cooling steam along whole length of the combustion tube 5.

However, although cooling steam is supplied at the middle portion of the combustor in FIG. 1 (i.e., the portion where the combustion tube 5b and the tail pipe 5a in FIG. 1 is joined) and divided into two flows of cooling steam (i.e., a flow towards upstream and flow towards downstream), a pair of cooling steam inlet pipes 511, 513 and a pair of cooling steam outlet pipes 515, 517 are connected to the combustion tube 5 in this embodiment. Namely, the cooling steam inlet pipe 511 and outlet pipe 515 are connected to the wall of the combustion tube 5 at the outlet end (the turbine end) thereof, and the cooling steam inlet pipe 513 and the outlet pipe 517 are connected to the wall of the combustion tube 5 at the inlet end (the main fuel nozzle side end) thereof.

In this embodiment, two groups of cooling steam passages, i.e., first cooling steam passage 523 which is connected to the inlet pipe 511 and outlet pipe 517 and second cooling passages 521 connected to the inlet pipe 513 and outlet pipe 515 are formed within the wall of the combustion tube 5. Cooling steam flows through the first cooling steam passages 523 in the upstream direction (i.e., from the outlet side to the inlet side of the combustion tube 5) and in the downstream direction (i.e., from the inlet side to the outlet side of the combustion tube 5).

Figure 6A:
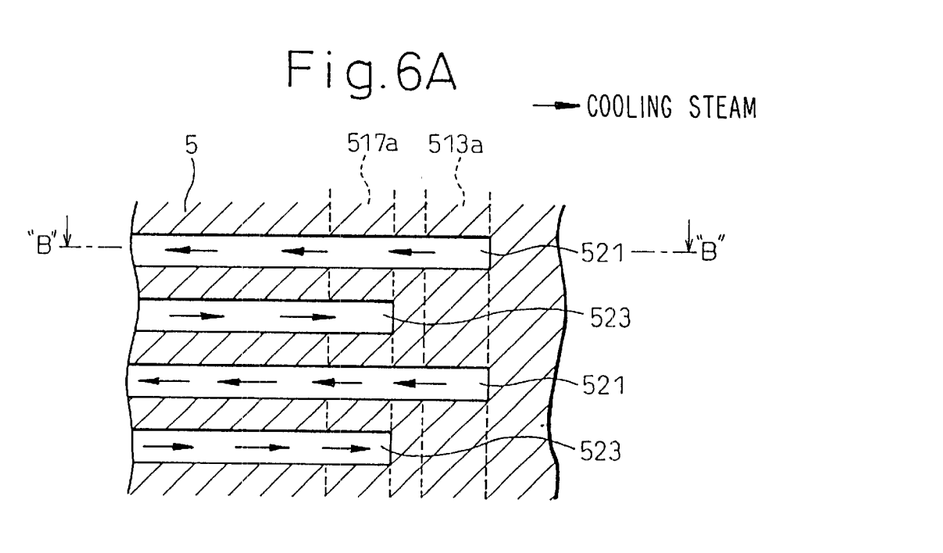
FIGS. 6A and 6B schematically show the arrangement of cooling steam passages in the combustor in FIG. 5.
Figure 6B:
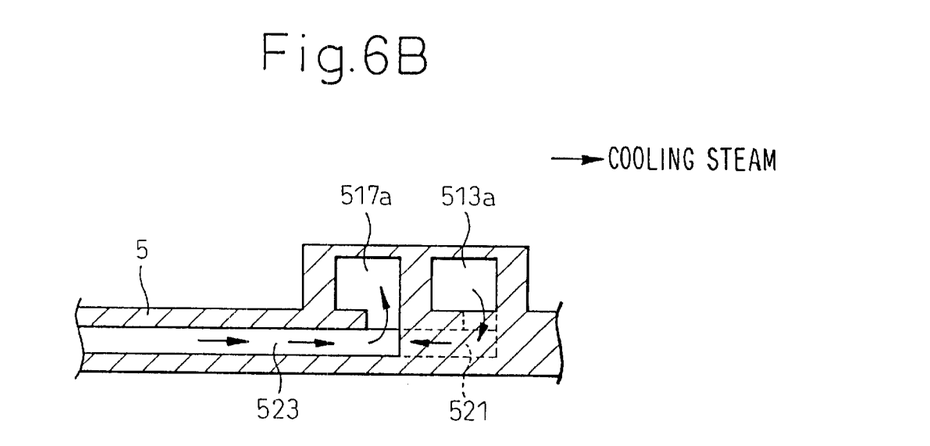

FIGS. 6A and 6B schematically show the arrangement of the first cooling steam passages 523 and the second cooling steam passages 521 in the wall of the combustion tube 5.

FIG. 6A shows the arrangement of the passages along the circumference of the combustion tube 5 at the outlet portion 52 thereof. As shown in FIG. 6A, the first cooling steam passages 523 and the second cooling steam passages 521 are disposed alternately around the circumference of combustion tube 5. FIG. 6B is a section view taken along the line "B"—"B" in FIG. 6A. As shown in FIG. 6B, an annular steam inlet manifold 513a which connects the second cooling steam passages 521 to the steam inlet pipe 513 and an annular steam outlet manifold 517a which connects the first cooling steam passages 523 to the steam outlet pipe 517 are formed around the outlet portion 52 of the combustion tube 5. Although not shown in the drawing, an annular steam inlet manifold 511a and an annular steam outlet manifold 515a are formed around the inlet portion of the combustion tube 5. The arrangement of the steam manifolds at the inlet of the combustion tube 5 is similar to the steam manifolds in FIGS. 6A and 6B. The annular inlet manifold 511a connects the first cooling steam passages 523 to the steam inlet pipe 511 and an annular steam outlet manifold 515a connects the first cooling steam passages 523 to the steam outlet pipe 515.

In this embodiment, flow rates of cooling steam in the first and second cooling steam passages 523, 521 are adjusted in such a manner that the inlet steam temperatures in the inlet manifolds 511a and 513a are the same, and the outlet steam temperatures in the outlet manifolds 515a and 517a are the same. For example, the steam temperature in the inlet manifolds 511a and 513a (i.e., the steam temperature at the inlet of the cooling. steam passages 521 and 523) is adjusted to about 300° C. and the steam temperature in the outlet manifolds 515a and 517a (i.e., the steam temperature at the outlet of the cooling steam passages 521 and 523) is adjusted to about 600° C.

Therefore, the average temperatures of the steam flowing through the cooling steam passages 521 and 523 becomes nearly uniform along the length of the cooling steam passages 521 and 523.

As explained before, fuel injected in the combustion tube 5 burns while it flows through the combustion tube 5. Therefore, the temperature of the combustion gas is not uniform along the axis of the combustion tube 5. Namely, the temperature of the combustion gas is relatively high at the inlet side of the combustion tube 5 and relatively low at the outlet side of the combustion tube 5. On the other hand, the wall temperature of the combustion tube 5 (the metal temperature) changes in accordance with the steam temperature in the cooling steam passages. More specifically, difference between the metal temperature of the combustion tube 5 and the steam temperature in the cooling steam passages is nearly constant regardless of the combustion gas temperature in the combustion tube 5. In this embodiment, as explained above, since the cooling steam in the cooling steam passages 521 and 523 flows in the direction opposite to each other, the average steam temperature in the cooling steam passages 521 and 523 becomes nearly constant along the length of the combustion tube 5. Therefore, the metal temperature of the combustion tube 5 also becomes nearly constant along the length of the combustion tube 5 and, since the excessive cooling of the wall of the combustion tube does not occur, the consumption of the cooling steam can be reduced in the present embodiment.

(3) Third Embodiment

Figure 7:
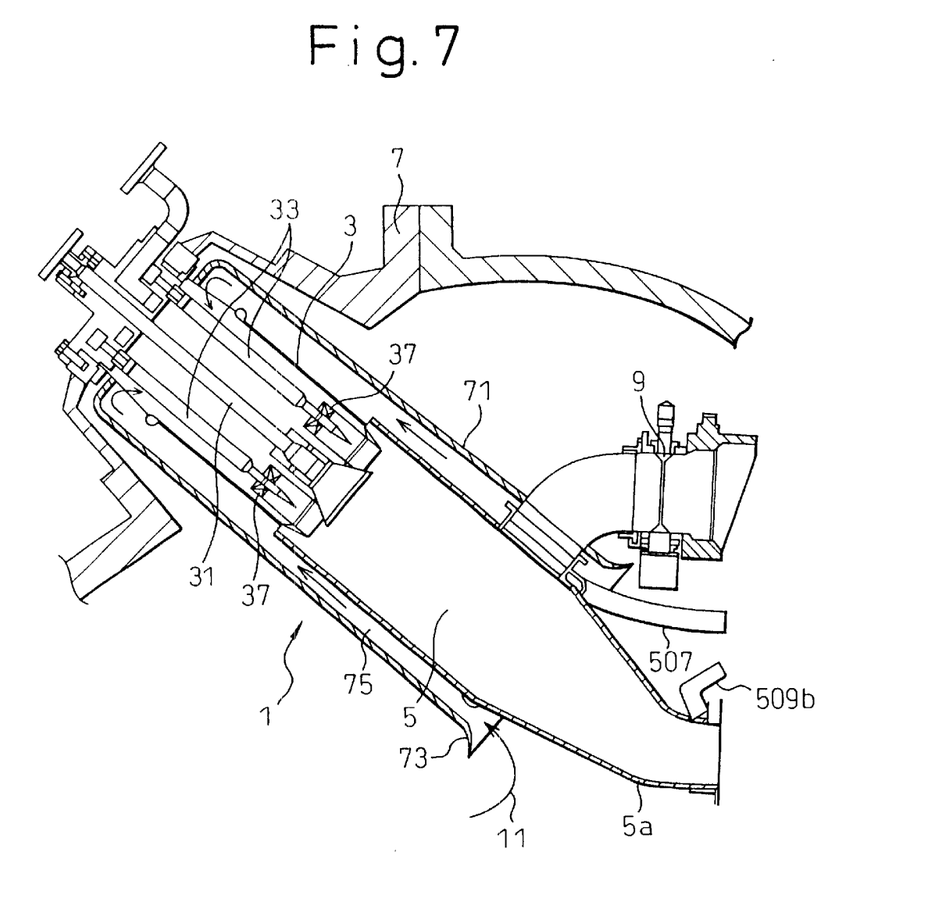
FIG. 7 is a longitudinal section view showing a general construction of a gas turbine combustor according to a third embodiment of the present invention.

FIG. 7 is a longitudinal section view of a gas turbine combustor according to the third embodiment of the present invention. In this embodiment, both steam and air are used for cooling the combustor.

In FIG. 7, reference numerals the same as those in FIG. 5 designate elements similar to those in FIG. 5.

In this embodiment, similarly to the combustor in FIG. 5, the combustor portion 5 of the combustor 1 is formed as a one-piece member and is referred to as combustion tube 5. In FIG. 7, numeral 507 denotes a cooling steam inlet pipe connected to the portion of the combustion tube 5 at the middle of the length thereof, and 509b denotes a cooling steam outlet pipe connected to the portion of the combustion tube 5 at the outlet thereof. In this embodiment, the downstream half of the combustion tube 5 is cooled by cooling steam. Namely, cooling steam is introduced from the inlet pipe 507 into cooling steam passages formed in the wall of the downstream half of the combustion tube 5 and, after cooling the downstream half of the combustion tube 5, collected through the outlet pipe 509b.

However, in this embodiment, the upstream half of the combustor is cooled by air. Further, combustion air supplied to the nozzle portion 3 is used for cooling the upstream half of the combustion tube.

As can be seen from FIG. 7, a cylindrical cooling shroud 71 is disposed around the upstream half of the combustion tube 5. The shroud 71 extends from the end of the nozzle portion to the middle of the length of the combustion tube 5. One end (a upstream end) of the shroud 71 is attached to the nozzle portion 3 of the combustor at the portion upstream of the combustion air inlet 35 and forms a closed end. The other end (a downstream end) of the shroud 71 is provided with funnel shaped inlet cone 73 and communicates with the inside of the casing 7. The annular space between the shroud 71 and the combustion tube 5 acts as a cooling air passage 75 for cooling the combustion tube 5.

In this embodiment, combustion air in the casing 7 flows into the cooling air passage 75 through the inlet cone 73 and flows into the nozzle portion 3 of the combustor 1 from the combustion air inlet openings 35 after passing through the cooling air passage 75. Combustion air flowing into the nozzle portion 3 flows into the combustion tube 5 through the pilot nozzle 31 and main nozzle 33.

When the combustion air flows through the passage 75, the wall of the upstream half of the combustion tube 5 is cooled by combustion air by convective cooling. As explained before, the temperature of combustion air is relatively low in the upstream half of the combustion tube 5 and the heat load of the upstream half of the combustion tube is smaller than that of the downstream half of the combustion tube 5. Since the heat load is relatively low, the wall of the upstream half of the combustion tube can be sufficiently cooled by convective cooling using cooling air without using film air cooling.

Therefore, in this embodiment, the downstream half of the combustion tube 5, where the heat load of the wall is relatively high, is cooled by conventional steam cooling system and the upstream half of the combustion tube 5, where the heat load of the wall is relatively low, is cooled solely by convective cooling using combustion air.

Since both air cooling and steam cooling are used for combustion tube 5, steam used for cooling the upstream half of the combustor in the conventional steam cooling system is not required and the consumption of steam is substantially reduced in this embodiment.

In this embodiment, combustion air (cooling air) passes through the cooling air passage 75 before flowing into the combustor 1. However, since the cooling air passage 75 is formed by a relatively large annular clearance between the shroud 71 and combustion tube 5, the flow path thereof is relatively short. Therefore, pressure drop of the combustion air through the cooling air passage 71 is relatively small. Thus, in this embodiment, the pressure of air after cooling the combustion tube 5 is still sufficiently high for use as combustion air. In other words, all the air passing through the cooling air passage 75 is introduced into the nozzle portion 3 and used for combustion air in this embodiment. Since all of cooling air is used as combustion air and no cooling air is discharged into the combustion tube 5 directly in this embodiment, dilution of combustion gas by cooling air does not occur. Further, since cooling air after cooling the combustion tube 5 is used as combustion air in this embodiment, consumption of cooling air required for cooling the combustor is practically negligible. Therefore, a temperature drop of combustion gas, as well as a decrease in the amount of combustion air, can be prevented, at the same time, in this embodiment.

What is claimed is:

1. A cooling system for a combustor of a gas turbine which generates combustion gas by burning fuel for driving a turbine comprising:

a cylindrical combustion tube having an inlet end and an outlet end and forming a combustion chamber therein for burning fuel supplied from the inlet end thereof and supplying combustion gas to a turbine from the outlet end thereof;

a plurality of cooling steam passages formed in the wall of the combustion tube and extending along the length of the combustion tube between the inlet end and the outlet end, said cooling steam passages including first cooling steam passages in which cooling steam flows in a first direction and second cooling steam passages in which cooling steam flows in a second direction opposite to the first direction.

2. A cooling system for a gas turbine combustor as set forth in claim 1, wherein the first cooling steam passage and the second cooling steam passages are disposed alternately in a circumferential direction of the combustion tube.

* * * * *